(12) United States Patent
Hamada et al.

(10) Patent No.: US 6,270,693 B1
(45) Date of Patent: Aug. 7, 2001

(54) THERMISTOR COMPOSITION

(75) Inventors: Kazuyuki Hamada; Hiroshi Oda, both of Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/659,280

(22) Filed: Sep. 12, 2000

(30) Foreign Application Priority Data

Sep. 16, 1999 (JP) .................................................. 11-261781

(51) Int. Cl.$^7$ ................................. H01B 1/08; H01C 7/06
(52) U.S. Cl. ................................. 252/519.51; 252/521.2; 338/22 R; 338/225 D
(58) Field of Search ............................ 252/519.51, 521.2; 423/138, 49, 594; 338/22 R, 225 D

(56) References Cited

U.S. PATENT DOCUMENTS 5,731,049 * 3/1998 Tailhades et al. .................... 427/597

OTHER PUBLICATIONS

Abd et al; "Study of The Jump Length Effect on The Physical Properties of Mn–Doped $Co_{0.6}Zn_{0.4}$ Ferrites" *Phys. Stat. Sol.* (9) 157,523 pp 523–529, 1996.*

Henaish "Thermal Studies on Doped Cobalt –Zluc Ferrite" *Indian Ceram.* (1995), 38(2) Abstract Only.*

Elshora et al. "Dielectric Properties of $Co_6Zn_4$ $Mm_x$ $Fe_{z-x}O_4$" *Proc Indian Natl Sci. Acad*, Part A (1994) Abstract Only.*

Patent Abstract of Japan, Publication 07022206 A dated Jul. 6, 1993 and translation.

JP Application No. 60–150998 dated Jul. 8, 1985 and translation.

* cited by examiner

*Primary Examiner*—Mark Kopec
(74) *Attorney, Agent, or Firm*—Pitney, Hardin, Kipp & Szuch LLP

(57) ABSTRACT

A thermistor composition that is in use within a range of room temperature to 400° C. has the general formula $Mn_{2-a-b-c}Zn_aNi_bFe_{c+d}Co_{1-d}O_4$, wherein $0.1 \leq a<1$, $0 \leq b<1$, $0<c<1$, $0 \leq d<1$ and $0.1<a+b<1$. A preferred thermistor composition has a B constant ($B_{25/85}$) within a range of 3,300–4,960 K, a resistivity ($\rho_{25}$) within a range of 400–88,000 Ω·cm and a resistance variation rate ($\Delta R_{25}$) of 2% or less. The composition is suitable for a thermistor or a thermistor device using the same.

7 Claims, 2 Drawing Sheets

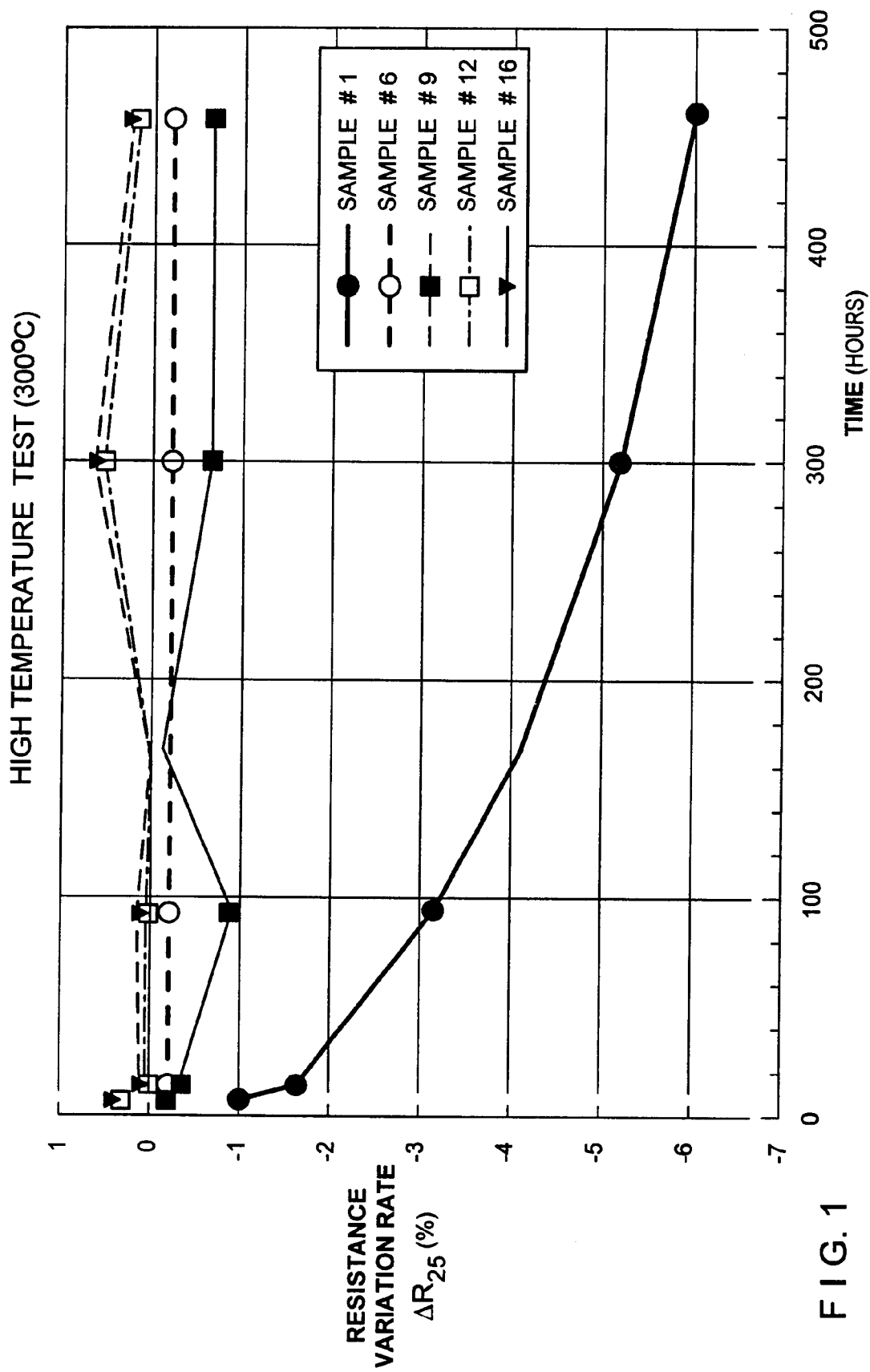
F I G. 1

THERMISTOR COMPOSITION

BACKGROUND OF THE INVENTION

1. Field of the Invention

The present invention relates to a thermistor composition having a preferred resistance value and B constant and being available in a wide temperature range from room temperature to higher temperatures such as 400° C.

2. Description of the Related Art

Sintered products, such as metal oxides of the Mn—Ni or Mn—Ni—Co composition, have been known as thermistors in the art.

These thermistor compositions are desired to have a wide range of resistivity. Various types of thermistor composition have been provided in response to this requirement. The sintered substance has a B constant of approximately 2,000–5,000 K and its resistance value varies by 2–5% when the temperature varies by 1° C. near room temperature. Therefore, it is possible to measure the temperature at a high precision, approximately ¹⁄₁₀₀° C. on the basis of the resistance value of such a thermistor. Accordingly, it can be widely used as a temperature sensor near room temperature due to this property.

The thermistor used near room temperature, however, is disadvantageous because its resistivity varies remarkably when it is used at temperatures above 250° C. for a long period of time.

In order to solve this problem, JP 62-11201A discloses a thermistor device having a metal oxide of the Mn—Ni composition into which $SiO_2$ is added, wherein the variation of resistance characteristic in a high temperature range of 300–500° C. is reduced. This thermistor device, however, is not suitably available near room temperature because its resistivity increases remarkably.

SUMMARY OF THE INVENTION

An object of the present invention is to provide a thermistor composition which is useful within a wide temperature range from room temperature to 400° C.

Another object of the present invention is to provide a thermistor using the above-mentioned thermistor composition.

A further object of the present invention is to provide a thermistor device using the above-mentioned thermistor.

The present invention is directed to a thermistor composition having a general formula $Mn_{2-a-b-c}Zn_aNi_bFe_{c-d}Co_{1-d}O_4$, wherein $0.1 \leq a < 1$, $0 \leq b < 1$, $0 < c < 1$, $0 \leq d < 1$ and $0.1 < a+b < 1$.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 1 shows high-temperature test results for samples of the present invention and comparative samples allowed to stand at 300° C.

DETAILED DESCRIPTION OF THE PREFERRED EMBODIMENTS

Figure 2:
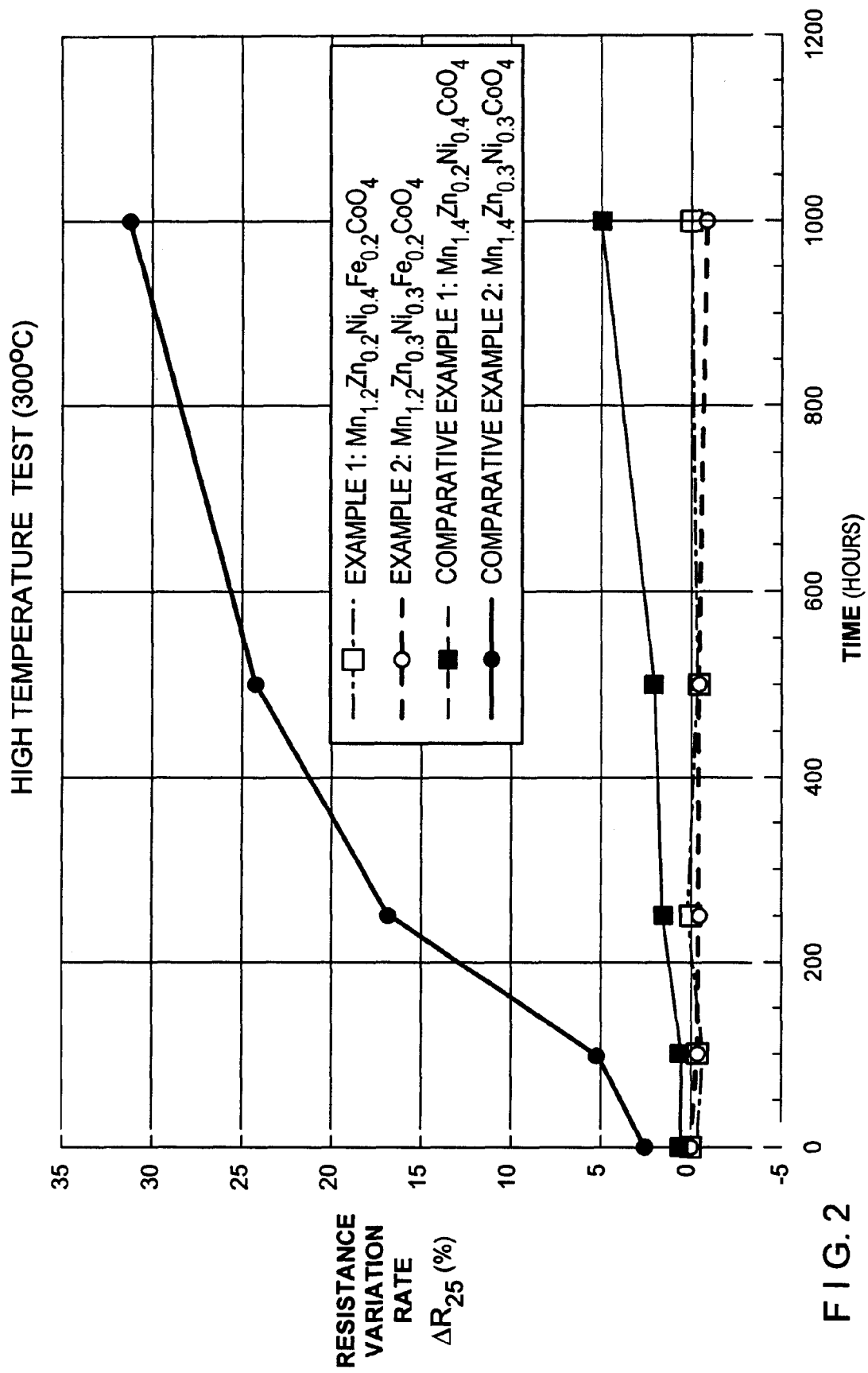
FIG. 2 shows high-temperature test results for examples and comparative examples allowed to stand at 300° C.

In a thermistor composition having the general formula $Mn_{2-a-b-c}Zn_aNi_bFe_{c+d}O_4$ according to the present invention, the partial replacement of manganese atoms with zinc atoms can give a thermistor a smaller resistance variation rate and improve the thermistor in stability at high temperatures. The partial replacement of manganese atoms with iron atoms can control the B constant of a thermistor while maintaining the resistivity of the thermistor. The partial replacement of iron atoms with cobalt atoms can give a thermistor a smaller resistivity while maintaining the B constant of the thermistor.

The addition of too few zinc atoms causes the variation of resistance to increase over time. An excessively large addition amount of zinc atoms may sometimes lead to a partial precipitation of zinc oxide, causing an increase in the variation of resistance. The addition of no iron atoms also causes the variation of resistance to increase over time. An excessively large addition amount of iron atoms unfortunately increases a thermistor in resistivity. In a composition that contains nickel atoms, the partial replacement of zinc atoms by nickel atoms can greatly control the resistivity and B constant of a thermistor so as to allow to design a thermistor device with the desired properties. An excessively large addition amount of nickel atoms causes an increase in resistance variation rate. Addition of cobalt atoms can give a thermistor a smaller resistivity while still maintaining the B constant of the thermistor. An excessively large addition amount of cobalt atoms may lead to a partial precipitation of cobalt oxide, causing an increase in resistance variation.

Therefore, ranges for a, b, c and d are determined to be $0.1 \leq a < 1$, $0 \leq b < 1$, $0 < c < 1$, $0 \leq d < 1$ and $0.1 < a+b < 1$. Preferably the ranges are $0.1 \leq a \leq 0.6$, $0 \leq b \leq 0.5$, $0 < c \leq 0.4$, $0 \leq d \leq 0.4$ and $0.1 < a+b < 1$. More preferably the ranges are $0.1 \leq a \leq 0.6$, $0 \leq b \leq 0.5$, $0.2 \leq c \leq 0.4$, $0 \leq d \leq c0.2$ and $0.1 < a+b \leq 0.6$.

Starting materials for use in the present invention are not limited to the following examples particularly so long as they are oxidized upon calcination. They may include, for example, oxides and carbonates of the above-mentioned Mn, Zn, Ni, Fe and Co atoms.

EXAMPLES

The present invention will now be described in detail with exemplifying Examples thereof.

First, 99.9%-pure powders of commercially available materials, $Mn_2O_3$, ZnO, NiO, $Fe_2O_3$ and $Co_3O_4$, were measured to prepare compositions indicated in Table 1, mixed for 18 hours in a ball mill, then dried, and allowed to stand in the atmosphere at a temperature of 850–900° C. for 2 hours to calcine. They were pulverized again for 18 hours in the ball mill and dried. An aqueous solution of 2% polyvinyl alcohol was added and the resulting mixture was dried through vaporization. Granulation and grading was carried out using a dry-type grinder equipped with a mortar and a pestle. Next, the resulting granules were collected by an appropriate amount and compacted at a pressure of 19.7 MPa (200 kg/cm$^2$) into a disk-shaped pellet with an outer diameter of 7 mm and a thickness of 1.5 mm. The pellet was sintered at a temperature of 1,150–1,200° C. in the atmosphere for 1 hour.

Silver electrodes were applied onto both surfaces of the pellets sintered and baked at 620° C. for 10 minutes. The resulting thermistor's resistance value was measured at 25° C. ($R_{25}$) in an oil bath, which was then converted into a resistivity ($\rho_{25}$). A resistance value at 85° C. ($R_{85}$) was also measured to calculate a B constant ($B_{25/85}$) from these two values. The B constant was calculated by the following equation:

$$B_{25/85}=(lnR_{25}-lnR_{85})/[1/(273.15+25)-1/(273.15+85)].$$

Each value is shown in Table 1.

Each sample was allowed to stand in the atmosphere at 150° C. for 1000 hours and then its resistance ($R'_{25}$) was measured to calculate a resistance variation rate ($\Delta R_{25}$) relative to the initial resistance at 25° C. ($R_{25}$) by the following equation:

$$\Delta R_{25}=[(R'_{25}-R_{25})/R_{25}]\times 100$$

The obtained results are shown in Table 1.

TABLE 1

| Sample Number | Mn | Zn | Ni | Fe | Co | $\rho_{25}$ ($\Omega \cdot$ cm) | $B_{25/85}$ (K.) | $\Delta R_{25}(\%)$ After 1,000 hrs |
|---|---|---|---|---|---|---|---|---|
| *1 | 1.7 | 0.1 | 0 | 0.2 | 1.0 | 167000 | 4657 | 3.6 |
| 2 | 1.6 | 0.2 | 0 | 0.2 | 1.0 | 53300 | 4536 | 1.2 |
| 3 | 1.5 | 0.3 | 0 | 0.2 | 1.0 | 37400 | 4662 | 1.2 |
| 4 | 1.4 | 0.4 | 0 | 0.2 | 1.0 | 6460 | 4795 | 0.2 |
| 5 | 1.3 | 0.5 | 0 | 0.2 | 1.0 | 3430 | 4728 | 0.3 |
| 6 | 1.2 | 0.6 | 0 | 0.2 | 1.0 | 4050 | 4722 | 0.15 |
| 7 | 1.1 | 0.6 | 0 | 0.3 | 1.0 | 4577 | 4612 | 0.6 |
| 8 | 1.0 | 0.6 | 0 | 0.4 | 1.0 | 4722 | 4556 | 0.8 |
| 9 | 1.4 | 0.6 | 0 | 0.2 | 0.8 | 8040 | 4967 | 1.1 |
| 10 | 1.4 | 0.6 | 0 | 0.3 | 0.7 | 16600 | 4956 | 1.5 |
| 11 | 1.4 | 0.6 | 0 | 0.4 | 0.6 | 29600 | 4963 | 1.8 |
| 12 | 1.2 | 0.1 | 0.5 | 0.2 | 1.0 | 422 | 3483 | 0.9 |
| 13 | 1.2 | 0.2 | 0.4 | 0.2 | 1.0 | 523 | 3650 | 0.6 |
| 14 | 1.2 | 0.3 | 0.3 | 0.2 | 1.0 | 800 | 3850 | 0.3 |
| 15 | 1.2 | 0.4 | 0.2 | 0.2 | 1.0 | 1100 | 4077 | 0.2 |
| 16 | 1.2 | 0.5 | 0.1 | 0.2 | 1.0 | 2000 | 4390 | 0.15 |
| *17 | 1.2 | 0 | 0.6 | 0.2 | 1.0 | 1600 | 3850 | 6.0 |
| *18 | 1.4 | 0.6 | 0 | 0 | 1.0 | 4000 | 5140 | 2.5 |

The marks * in Table 1 indicate comparative samples other than those according to the present invention. The comparative samples were produced in the same method as described above.

FIG. 1 shows high-temperature test results for the samples of the present invention and the comparative samples allowed to stand in the atmosphere at 300° C.

As obvious from Table 1 and FIG. 1. in the compositions of the present invention, the values of $\rho_{25}$ are within a range of 400–88,000 $\Omega$·cm and the values of $B_{25/85}$ are within a range of 3,300–4,960 K. Both ranges are sufficient for practical use. The values of $\Delta R_2$ are 2% or less either at 150° C. or 300° C., which are very small and stable.

Next, FIG. 2 will be described hereunder in detail on the basis of Examples 1–2 and Comparative Examples 1–2.

Examples 1–2 and Comparative Examples 1–2

Example 1

Example 2

Comparative Example 1

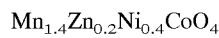

Comparative Example 2

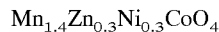

Test Conditions:

Each sample is in the form of a sintered disk of $\angle 7.2$ mm ×1 mm having electrodes formed on both surfaces thereof. Each sample is allowed to stand within a high-temperature bath at 300° C. and is taken out of the high-temperature bath at 7, 100, 250, 500, and 1,000 hours, respectively, then allowed to stand for 1 hour to measure its resistance in a constant temperature liquid bath.

Resistance variation rate(%)=[(Resistance after taking out–Resistance before test)/Resistance before test]×100

FIG. 2 shows high-temperature test results for Examples 1–2 and Comparative Examples whose samples are allowed to stand in the atmosphere at 300° C.

Although the above-mentioned examples are produced as tablets formed by compacting powders, other samples such as sheets formed by a doctor blade method may also be effective for the present invention. The properties of thermistor compositions according to the present invention are not influenced by their production methods.

As obvious from the above, a thermistor is produced using a thermistor composition of the present invention. It is useful for general purpose devices, such as a thermostat, and is stable because it exhibits a resistance variation rate of 2% or less at 300° C. or less. The thermistor consisting of this thermistor composition is suitable for use in a temperature compensation device for a circuit that is employed near room temperature as well as a temperature sensor for preventing a gas range from overheating at temperatures above 250° C. Therefore, it has an extremely large industrial value due to its wide application range.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A thermistor composition having a general formula $Mn_{2-a-b-c}Zn_aNi_bFe_{c+d}Co_{1-d}O_4$, wherein $0.1 \leq a \leq 0.6$, $0 \leq b \leq 0.5$, $0 < c \leq 0.4$, $0 \leq d \leq 0.4$ and $0.1 < a+b < 1$.

2. The thermistor composition according to claim 1, which is usable within a range of room temperature to 400° C.

3. The thermistor composition according to claim 1, further having a B constant within a range of 3,300–4,9600° K.

4. The thermistor composition according to claim 1, further having a resistivity within a range of 400–88,000 $\Omega$·cm.

5. The thermistor composition according to claim 1, further having a resistance variation of 2% or less.

6. A thermistor comprising the thermistor composition according to claim 1.

7. A temperature compensation device for a circuit comprising the thermistor according to claim 6.

* * * * *